Jan. 15, 1957

L. VALANTIN 2,777,700

GRAVEL DISTRIBUTING DEVICE FOR ROAD SURFACING MACHINES

Filed June 17, 1952

Inventor
Lucien Valantin
By Robert E Burns
Attorney

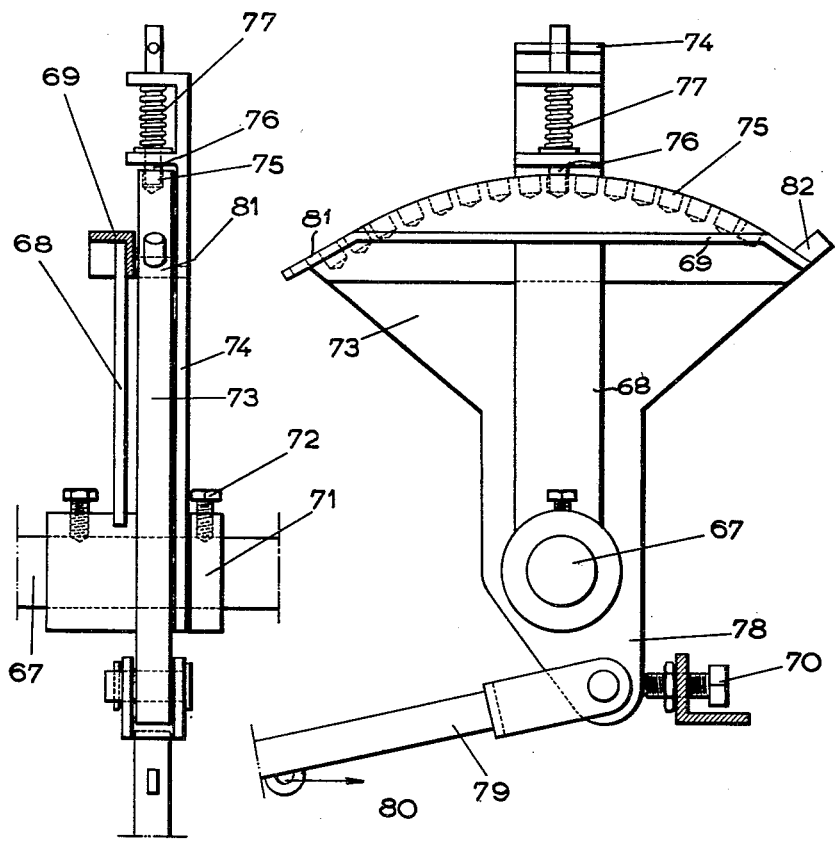
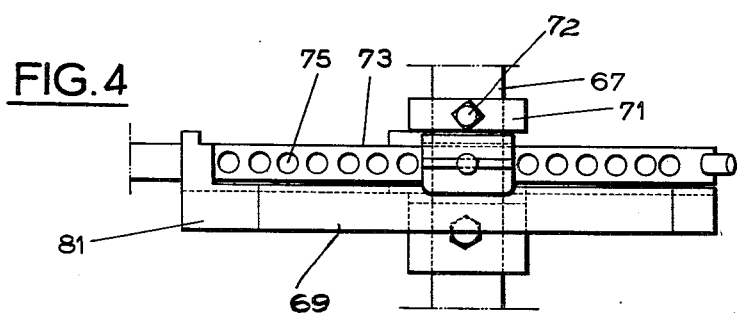

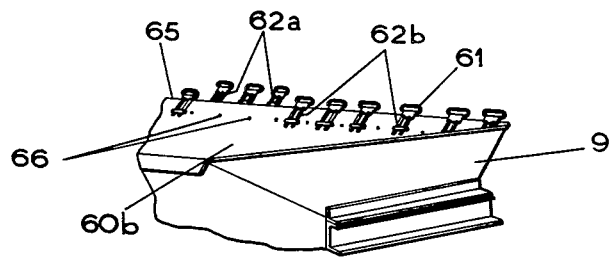
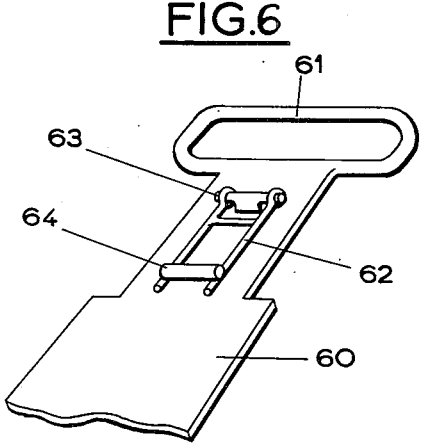
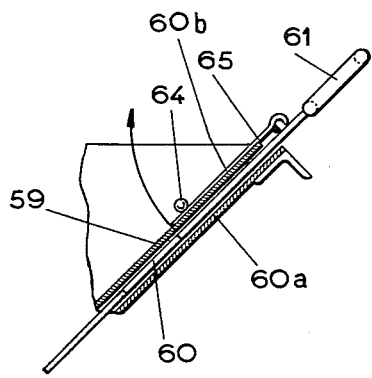
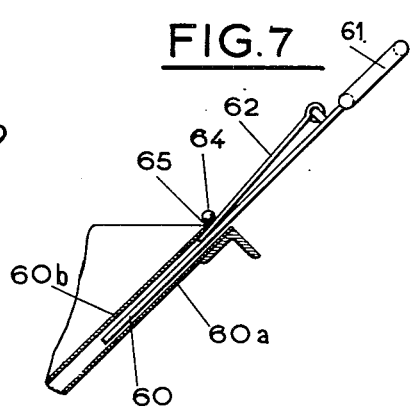

Jan. 15, 1957 L. VALANTIN 2,777,700
GRAVEL DISTRIBUTING DEVICE FOR ROAD SURFACING MACHINES
Filed June 17, 1952 4 Sheets-Sheet 4
FIG.9.
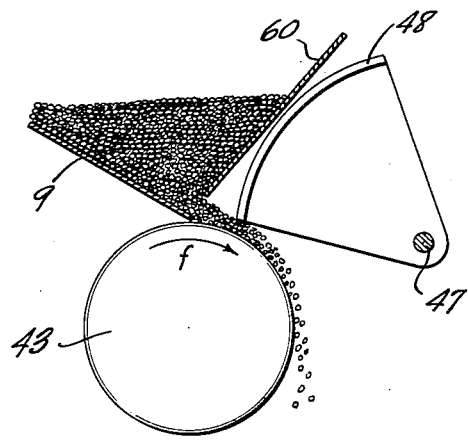
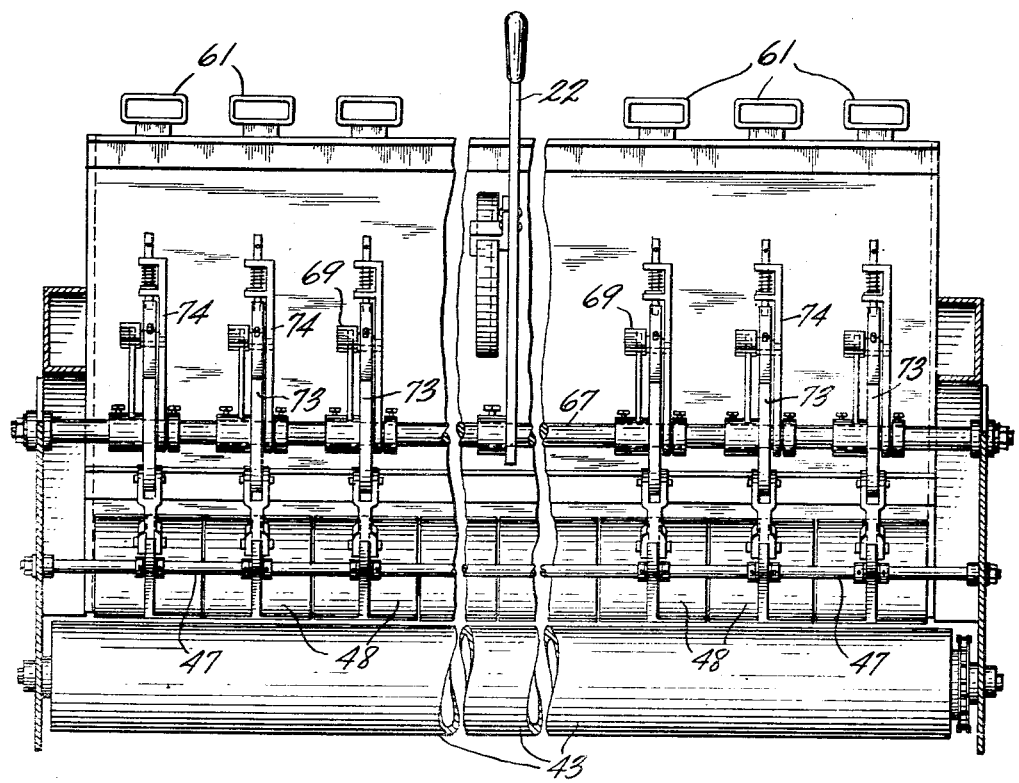
FIG.10.
INVENTOR
LUCIEN VALANTIN
BY
ATTORNEY

United States Patent Office 2,777,700
Patented Jan. 15, 1957

2,777,700

GRAVEL DISTRIBUTING DEVICE FOR ROAD SURFACING MACHINES

Lucien Valantin, Blainville-sur-l'Eau, France

Application June 17, 1952, Serial No. 293,918

Claims priority, application France June 21, 1951

5 Claims. (Cl. 275—2)

In the co-pending U. S. patent application Serial No. 105,122, filed June 16, 1949, now abandoned, I claimed an improved apparatus for making and repairing roads by spreading a binder and gravel on said roads, said apparatus comprising a small four-wheeled trailer disposed between a conventional dump truck and a conventional tank truck.

The trailer described in said patent application comprises a gravel hopper in which is poured the gravel of the dump truck, means for distributing the gravel from said hopper and a spray bar or pipe positioned in proximity to and forwardly of said means for distributing the gravel.

By means of said trailer it is possible to make and repair roads, both trucks advancing forwardly, and to ensure the distribution of said gravel just behind the spreading of said binder without using any special equipment except my improved trailer.

It is an object of the present invention to improve the trailer claimed in my afore-mentioned patent application.

It is another object of the invention to provide a trailer with improved binder spreading means.

It is a further object of the invention to provide a trailer with improved gravel distributing means.

It is another object of the invention to provide means for surfacing roads with a coating more or less thick and/or more or less wide, as needed.

It is another object of the invention to provide a trailer which can be trailed while having only the rear wheels thereof engaging the ground, for allowing a quick travelling of said trailer.

The aforesaid and other objects, features and advantages of the invention will be more easily and fully understood from the illustration of one embodiment of a trailer including a gravel distributing device according to my invention, being understood that the invention is not restricted to the details of the illustrated and described embodiment but that is susceptible to modifications and adaptations.

In the attached drawings:

Fig. 1 is a side elevation of a trailer including a gravel distributing device according to the invention;

Fig. 2 is an end view of the quadrant controlling each of the sectors of the gravel distributing device;

Fig. 3 shows an elevational view of same quadrant;

Fig. 4 shows a plan view of said quadrant;

Fig. 5 is an isometric projection of the hopper showing the handles and brackets for controlling the shutters of the gravel distribution;

Fig. 6 is an enlarged view of one of said handles and brackets;

Figs. 7 and 8, respectively, show in opened and closed condition said shutters;

Fig. 9 is a partial side view of the gravel distributing members with parts omitted to show clearly the relative relatitionships among the shutters, the sectors and the distributing roller;

Fig. 10 is an end view of the gravel distributing unit as seen from the right in Fig. 1.

By referring to the drawings and firstly to Fig. 1, it will be observed that my trailer 1, including a gravel distributing device according to the invention, comprises all the necessary means for spreading the binder and distributing the gravel and is coupled by coupling means 2 to a conventional dump truck 3 having a coupling element 32 and advancing as shown by arrow F under normal conditions. In the rear of trailer 1 is coupled, by means of a coupling device 4, a conventional tank truck 5.

Trailer 1 consists primarly of a steel frame 6, a front axle comprising a single wheel 7, a rear axle comprising four wheels 8, a hopper 9 in which is delivered the gravel from the dump truck 3 by tilting the bucket 10 thereof (when bucket is in the position 10' shown in dotted lines, the tiltable door 11 being in its open position), a binder spreading device 12 and a gravel distributing device 13. The trailer further comprises a pump 14 drawing the binder from the tank truck 5 and forcing it into the binder spreading device 12, pump 14 being driven by an engine (not shown, but disposed behind the pump in Fig. 1) the exhaust gases thereof being used for heating the various elements or conduits through which the binder flows.

The binder leaves the tank truck 5 by pipe 15 connected to conduit 16 of the trailer by a fire-engine coupling or union 17. The binder drawn by pump 14 is forced by the pump through conduit 18 in one of the two lateral branches of frame 6. Each lateral branch of frame 6 consists of a U-iron, the fourth open side of which has been closed by a welded flat iron, forming a passage for the binder. The binder leaves pump 14 and conduit 18 through one of these passages in frame 6 and returns, through the other of the passages to conduit 19 connected by means of a fire-engine union 20 to a return pipe 21 of the tank truck 5. Between the pair of passages in the frame 6 is disposed a device 12 for spreading the binder, a device which will be described below in full detail.

The gravel is distributed just behind the binder by means of distribution device 13 which will also be described below and which is controlled by lever 22.

My improved trailer, when empty, is in equilibrium on the rear wheels 8, enabling therefore a quick and easy replacement of the front wheel 7 when the tire has burst.

The hopper or box 9 of the trailer consists of iron-plates secured by angle-irons. Said box rests on the frame 6 and can be taken apart to permit inspection and the replacement of used or worn elements. The gravel is poured in the hopper by tilting the bucket 10 of truck 3. The lateral iron-plates 46 of the box 9 are braced for supporting the gravel distributing roller 43 and the shaft 47 of the sectors 48 controlling the delivery of aggregate to be spread.

The device for spreading the binder is fed as aforementioned by pump 14 which delivers the binder into one of the side-members of frame 6 up to the spreading pipe or bar 12. Said bar, which may be a spray bar of known type, is of the continuous flow type and comprises e. g. about twenty nozzles 12a, each one discharging a flat spray 49 forming an angle of about 30° with the perpendicular to the road. The nozzles 12a are provided with valves 58 acted on by links 59. Accordingly four consecutive sprays coat the road, the extremities of the sprayed width receiving only (from the margin) a quarter, a half, and three quarters of the normal thickness of binder. It is therefore possible to effect perfect junctures without surpluses or shortages of binder.

All nozzles 12a are controlled by a single lever 50, thus it is possible to vary the quantity of nozzles in the open operative condition at any one time without stopping the trailer.

Several independent controls 51a (Fig. 1) which act upon links 59 are provided to effect the opening of two, three or four nozzles 12a to permit the desired width of binder spraying to be realized.

When the nozzles 12a are closed or when the pressure, during the spraying, is above the prescribed pressure, the binder returns to the tank-truck 5 through the other side-member 6 which is used as a return passage, after having traversed a regulatable pressure relief valve (not shown) which permits a constant pressure to be obtained irrespective of the number of open nozzles 12a. Said valve is, when starting the operation of my device, heated by the hot exhaust gases of the engine (not shown) at the same time as the pump 14 in order to prevent an overpressure which would occur if said valve remained closed on starting.

The gravel distributing device is disposed at the rear of hopper 9 in which is received the gravel from truck 3 (Fig. 1).

The rear of the hopper 9 consists of a pair of sheet-irons 60a and 60b between which can slide shutters 60 consisting of strips of iron of various widths. Said shutters 60 in their "low" position (Fig. 8) prevent the gravel from contacting roller 43, thereby reducing the gravel distribution width. In their "high" position (Fig. 7), the shutters set free roller 43. In order to hold shutters 60, each shutter is provided with a handle 61 and a bracket or yoke 62 mounted on a pin 63 welded on the shutter. The rod 64 of each yoke 62 engages the upper rim 65 of sheet iron 60b of the hopper, when it is desired to hold the shutter in its "high" position corresponding to the free flowing of gravel (Fig. 7). The handle 61 secured to each shutter allows an easy handling of the movable yoke 62 and therefore of the shutter. Raising of the yoke 62 is sufficient to cause the shutter 60 to move into its "low" position corresponding to the closed position (Fig. 8). In Fig. 8 the yokes 62a are shown in their "high" position and the yokes 62b in their "low" position.

The shutters 60 are guided between sheets 60a and 60b by means of spacers and rods 66.

The gravel descending from hopper 9 is carried along by roller 43 which revolves at a suitable speed driven from rear wheels 8 in any suitable manner. As hereinabove described, the maximum width of gravel distribution can be reduced by means of the shutters 60.

It is also possible to regulate the thickness of the gravel coating by acting on the sectors 48 which can rotate around a shaft 47 thereby opening a regulatable variable passage. The arcuate periphery of each sector is disposed above the distributing roller 43 and upon movement of the sectors 48 about the axis provided by shaft 47, the lower edge of the arcuate periphery may be moved toward and away from the periphery of the roller 43. The maximum opening of the sectors corresponds to the maximum raising of the shutters 60. Several sectors are provided, the length of the sectors corresponding to the width covered by the set of simultaneously controlled nozzles. Each sector can be set individually, this setting allowing the thickness of the surfacing on the margins thereof to be diminished in order to facilitate the formation of junctures. Movement of the sectors to effect the above-mentioned regulation of the thickness of the gravel discharged is effected by means of a lever linkage manually operable by the machine operator.

A main lever 22 controls simultaneously all the sectors, having yet regard to the individual setting. As a matter of fact, by means of a device (shown in fuller details on Figs. 2, 3 and 4 and hereinunder described) the sector or sectors 48 closed by the individual setting remain in their position when the main lever 22 is operated. Accordingly it is possible to open at any moment a sector 48 at its maximum aperture for allowing a big stone or a grass tuft or the like to pass, and to restore immediately the aforementioned sector 48 to its initial position, without disturbing the setting of the adjoining sectors.

A stop-screw 70 maintains each sector 48, when the sector is in its closed condition, at a suitable distance from roller 43, e. g. 5/32 inch, in order to prevent any jamming thereof.

The individual adjustment of each sector is obtained by means of the device shown in Figs. 2, 3 and 4.

Main lever 22 actuates a shaft 67 carrying in front of each sector a leg 68, an angle-iron 69 being welded at the top of leg 68.

Between a leg 68 and a stop 71, secured by a screw 72 on shaft 67, I provide a quadrant 73 and a lever 74 carrying a lug 76, the quadrant and lever rotating loosely on shaft 67.

The upper portion of quadrant 73 comprises a series of equidistant holes 75 in which may be lodged lug 76 which is maintained in the chosen hole by means of a compression spring 77.

When lug 76 is introduced e. g. in the foremost hole 75 of Fig. 2 (the hole which is on the extreme left on Fig. 3), and when the operator actuates lever 22 towards the right (as seen in Fig. 1), the leg 68 describes a portion of a circle toward the rear until a stop 81, welded in front of the angle-iron 69, hits lug 76 and drives quadrant 73. This rotation of the base 78 of quadrant 73, which base is linked by a rod 79 to the corresponding sector, opens said sector.

When lever 22 is brought back again forwardly, a return spring, not shown, acting in the direction of arrow 80, pulls rod 79, and the corresponding sector is closed. The sector is therefore only opened when stop 81 of lever 68 hits lug 76 inserted in hole 75 of quadrant 73. Accordingly the more the lug is disposed towards the rear (Fig. 2) or towards the right (Fig. 3) the more the opening of the sector will be delayed.

As the quadrant 73 and the lug-carrying lever 74 can freely rotate on shaft 67, stops are provided for maintaining said quadrant 73 and lever 74 in a suitable position: in the front they both hit a stop 81 welded to the angle-iron 69 and in the rear the base 78 of quadrant 73 hits the stop screw 70 and the lever 74 hits the right pin 82 welded to quadrant 73.

Of course there are as many sectors as quadrants on the main lever 22.

When it is desired to spread a road binder and gravel with my trailer 1, dump-truck 3 being full of gravel and tank-truck 5 full of binder, the engine of my trailer is started and the exhaust gases of the engine heat pump 14, spray-pipe 12 and passages in frame 6; bucket 10 of my trailer is tilted in position 10' for filling hopper 9 with gravel; the sectors 48, the shutters 60 and the cocks regulating the nozzles 12a are set for providing the desired width of surfacing; and the whole assembly (trucks and trailer) is started off. Then lever 50 (being also a clutch-lever) is actuated, thereby opening the cocks and setting gravel-distributing roller 43 in motion. The speed of the assembly is regulated with the help of a speedometer and the driver will maintain the speed of tractor-truck 3 at a speed corresponding to the selected spreading.

When bucket 10 of truck 3 is empty, the truck is replaced by another truck full of gravel, after simultaneously declutching and closing the cocks. For effecting the joining of the surfacing, the assembly backs up (the tank-truck 5 is started off) in order to be able to start again forwardly (according to the arrow F), slightly from behind the stopping line. When tank-truck 5 is empty another tank-truck full of binder is substituted.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the appended claims.

Having thus described the invention, what is claimed as new and desired to be secured by Letters Patent, is:

1. Gravel distributing mechanism for a road surfacing machine comprising, in combination with a hopper for gravel having a linear discharge opening and a back wall above said opening including a pair of stationary, spaced-apart inclined guide plates, a gravel distributing roller adjacent said hopper below said opening to receive gravel passing therethrough, means for regulating the width of the gravel distribution on the surface being coated comprising a plurality of laterally adjacent shutters freely slidable between the stationary inclined guide plates from a lower position wherein the lower edges of said shutters are adjacent said roller to an upper position wherein the discharge opening is freed for passage of the gravel between the lower edges of the shutters and the roller, and means for regulating the depth of the gravel passing through said opening comprising a plurality of sectors rotatably mounted adjacent said discharge opening for varying the height of said opening, said sectors having their arcuate peripheries disposed above said distributing roller with the lower end of the periphery of each sector substantially engageable with the periphery of the roller to close said opening against passage of gravel, and means for selectively moving said sectors relatively to said distributing roller to vary the distance between the periphery of said roller and the lower end of the arcuate periphery of each sector.

2. A gravel distributing mechanism as defined in claim 1, wherein each shutter is provided with a handle and a yoke disposed on a rod welded on said shutter, whereby each shutter may be brought to its upper position by pulling on the handle until the yoke bears upon the upper rim of the inclined plates.

3. Gravel distributing mechanism for a road surfacing machine comprising, in combination with a hopper for gravel having a linear discharge opening and a back wall above said opening including a pair of stationary, spaced-apart inclined guide plates, a gravel distributing roller adjacent said hopper below said opening to receive gravel passing therethrough, means for regulating the width of the gravel distribution on the surface being coated comprising a plurality of laterally adjacent shutters freely slidable between the stationary inclined guide plates from a lower position wherein the lower edges of said shutters are adjacent said roller to an upper position wherein the discharge opening is freed for passage of the gravel between the lower edges of the shutters and the roller, and means for regulating the depth of the gravel passing through said opening comprising a plurality of sectors rotatably mounted adjacent said discharge opening for varying the height of said opening, said sectors having their arcuate peripheries disposed above said distributing roller with the lower end of the periphery of each sector substantially engageable with the periphery of the roller to close said opening against passage of gravel, control means for individually setting the desired degree of rotation of each sector, and means for selectively moving said sectors relatively to said distributing roller in accordance with the setting of said control means to vary the distance between the periphery of said roller and the lower end of the arcuate periphery of each sector.

4. A gravel distributing device as defined in claim 1, wherein said means for selectively moving said sectors comprises a shaft, a main lever secured to said shaft, a stop secured on said shaft adjacent each of said sectors, a lever secured on said shaft adjacent each of said sectors, an angle-iron secured to said lever at the extremity thereof, a quadrant provided on its arcuate periphery with a series of holes loosely mounted on said shaft between said stop and said lever, a lug-carrying lever loosely mounted on said shaft between said stop and said lever, the lug of said lug-carrying lever being adapted to enter selectively into said holes, means for maintaining said lug in said one of said holes, and a link connecting the quadrants with their associated sectors.

5. Gravel distributing mechanism for a road surfacing machine comprising, in combination with a hopper for gravel having a linear discharge opening and a back wall above said opening including a pair of stationary, spaced-apart inclined guide plates, a gravel distributing roller adjacent said hopper below said opening to receive gravel passing therethrough, means for regulating the width of the gravel distribution on the surface being coated comprising a plurality of laterally adjacent shutters freely slidable between the stationary inclined guide plates from a lower position wherein the lower edges of said shutters are adjacent said roller to an upper position wherein the discharge opening is freed for passage of the gravel between the lower edges of the shutters and the roller, and means for regulating the depth of the gravel passing through said opening comprising a plurality of sectors rotatably mounted adjacent said discharge opening for varying the height of said opening up to a height corresponding to the opening defined by said shutters in their uppermost position, a shaft, a main lever secured to said shaft, said sectors having their arcuate peripheries disposed above said distributing roller with the lower end of the periphery of each sector substantially engageable with the periphery of the roller to close said opening against passage of gravel, a stop secured on said shaft adjacent each of said sectors, a lever secured on said shaft adjacent each of said sectors, an angle-iron secured to said lever at the extremity thereof, a quadrant provided on its arcuate periphery with a series of holes loosely mounted on said shaft between said stop and said lever, a lug-carrying lever loosely mounted on said shaft between said stop and said lever, the lug of said lug-carrying lever being adapted to enter selectively into said holes, means for maintaining said lug in said one of said holes, a link connecting the quadrants with their associated sectors, and means for limiting the rotation movement of said quadrant and said lug-carrying lever in both directions.

References Cited in the file of this patent

UNITED STATES PATENTS

| | | |
|---|---|---|
| 533,252 | Thomas | Jan. 29, 1895 |
| 894,859 | Southgate | Aug. 4, 1908 |
| 1,048,165 | Horne et al. | Dec. 24, 1912 |
| 1,588,837 | Jones | June 15, 1926 |
| 1,702,525 | Smith | Feb. 19, 1929 |
| 1,748,141 | Nickerson | Feb. 25, 1930 |
| 1,838,631 | Naber et al. | Dec. 29, 1931 |
| 2,159,554 | George | May 23, 1939 |
| 2,303,486 | McConnaughay | Dec. 1, 1942 |
| 2,403,820 | Miller | July 9, 1946 |

FOREIGN PATENTS

| | | |
|---|---|---|
| 976,899 | France | Nov. 1, 1950 |
| 985,817 | France | Mar. 14, 1951 |